(12) United States Patent
Jiang et al.

(10) Patent No.: US 11,409,568 B2
(45) Date of Patent: Aug. 9, 2022

(54) DYNAMICALLY SCALING OUT PODS USING A RECURSIVE WAY

(71) Applicant: International Business Machines Corporation, Armonk, NY (US)

(72) Inventors: Peng Hui Jiang, Beijing (CN); Hui Zhao, Beijing (CN); Wen Li, Beijing (CN); Kyle Joseph Snavely, Salt Lake City, UT (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 17/063,086

(22) Filed: Oct. 5, 2020

(65) Prior Publication Data

US 2022/0107842 A1 Apr. 7, 2022

(51) Int. Cl.
*G06F 9/50* (2006.01)
*G06F 9/54* (2006.01)

(52) U.S. Cl.
CPC ............ *G06F 9/5038* (2013.01); *G06F 9/505* (2013.01); *G06F 9/5077* (2013.01); *G06F 9/545* (2013.01)

(58) Field of Classification Search
CPC ...... G06F 9/5038; G06F 9/505; G06F 9/5077; G06F 9/545
See application file for complete search history.

(56) References Cited

U.S. PATENT DOCUMENTS

| 10,389,596 | B2 | 8/2019 | Strobel et al. |
| 10,411,947 | B2 | 9/2019 | Rangasamy et al. |
| 2017/0019462 | A1* | 1/2017 | Hara ................... H04L 67/1002 |
| 2019/0220315 | A1 | 7/2019 | Vallala et al. |
| 2019/0266022 | A1 | 8/2019 | Israni et al. |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Sisley N Kim
(74) *Attorney, Agent, or Firm* — Sonny Z. Zhan

(57) ABSTRACT

In an approach for pod scheduling and recursion, a processor schedules a master pod and one or more worker pods for applications to be deployed on a cluster. A processor builds a topology between the master pod and the one or more worker pods. A processor monitors a workload in the one or more worker pods. A processor determines whether any of the one or more worker pods needs to scale out. In response to determining that one of the one or more worker pods needs to scale out, a processor schedules a next layer of the one or more worker pods according to the workload.

9 Claims, 6 Drawing Sheets

DYNAMICALLY SCALING OUT PODS USING A RECURSIVE WAY

BACKGROUND

The present disclosure relates generally to the field of a container orchestration platform, and more particularly to dynamically scaling out pods.

A container orchestration platform is an open-source system for automating deployment, scaling, and management of containerized applications. The container orchestration platform may group containers that make up an application into logical units for easy management and discovery. Container orchestration is an automatic process of managing or scheduling the work of individual containers for applications based on microservices within multiple clusters. A pod may be a basic execution unit of a containerized application. A pod may represent a process running on a cluster. A pod may encapsulate an application's container (or, in some cases, multiple containers), storage resources, and options that govern how the container(s) should run. A pod may represent a unit of deployment: a single instance of an application in a container orchestration platform, which may include one or more containers that are tightly coupled and that share resources.

SUMMARY

Aspects of an embodiment of the present disclosure disclose an approach for pod scheduling and recursion. A processor schedules a master pod and one or more worker pods for applications to be deployed on a cluster. A processor builds a topology between the master pod and the one or more worker pods. A processor monitors a workload in the one or more worker pods. A processor determines whether any of the one or more worker pods needs to scale out. In response to determining that one of the one or more worker pods needs to scale out, a processor schedules a next layer of the one or more worker pods according to the workload.

DETAILED DESCRIPTION

Figure 1:
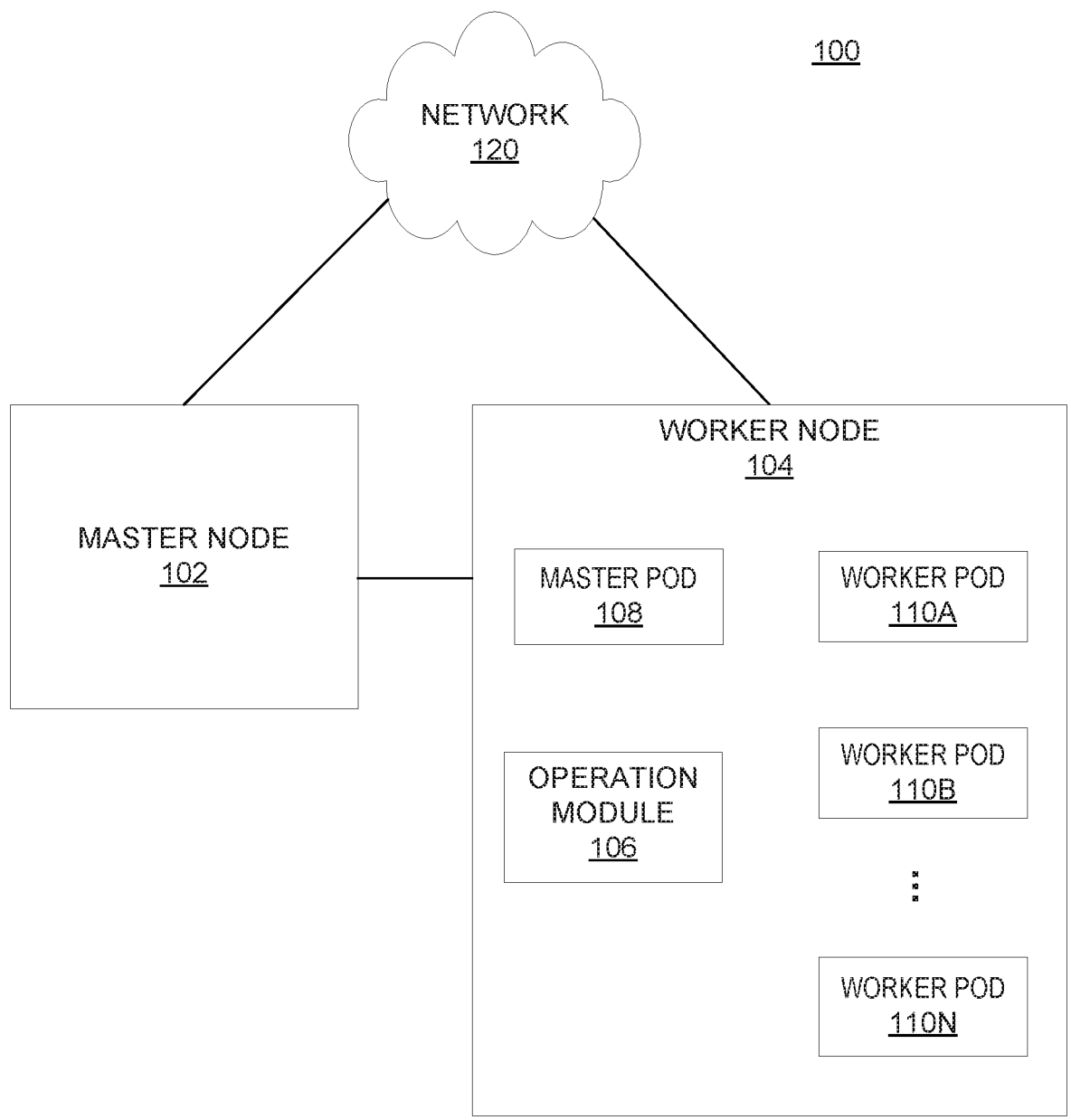
FIG. 1 is a functional block diagram illustrating a container orchestration platform scaling environment, in accordance with an embodiment of the present disclosure.

The present disclosure is directed to systems and methods for dynamically scaling out master and worker pods using a recursive way in a container orchestration platform.

Auto-scaling may be used in a container orchestration platform. The container orchestration platform may scale out resources belonging to the same type of pods. Embodiments of the present disclosure recognize that scaling may not be just a single type of pods, but with different combination, such as a master-worker mode, master-master mode, or other star, net, or service mesh mode. Embodiments of the present disclosure disclose dynamically scaling out master-worker pods using a recursive way via an operator in a container orchestration platform. Embodiments of the present disclosure recognize not only scaling worker pods but also scaling a master pod. For example, in order to support performance analysis based on a distributed transaction database and performance benchmark tool, embodiments of the present disclosure disclose deployments of a master-worker mode in a container orchestration platform, e.g., in a Kubernetes orchestration platform.

Embodiments of the present disclosure disclose different types of service in a container orchestration platform, which may include a Deployment, a StatefulSet, a DaemonSet, a Job and a Cron Job. Embodiments of the present disclosure recognize a need of supporting running applications once or several times in a Deployment, a StatefulSet, and a DaemonSet. Embodiments of the present disclosure recognize a need of supporting a pre-defined logic process in a Job and a Cron Job. Embodiments of the present disclosure recognize a need of supporting a dynamic process with vertical or horizontal pod scaling.

Embodiments of the present disclosure disclose that a server may be a distributed runtime service, for example, including Deployment, StatefulSet, and DaemonSet. A client may also be distributed deployment. Client applications may be deployed on worker pods. Workloads may be scheduled by a master pod. Worker pods may communicate with the server. A Kubernetes Operator may reside alongside worker pods to monitor and take action to reclusively scale out with different topology trees. Embodiments of the present disclosure disclose building up a client distributed application deployment with a Kubernetes Job. A master pod can be triggered with a Job. Worker jobs may be triggered with the Job associated with the master pod. A master Job and worker Jobs may be created using kubectl with yaml files. A master pod and batch worker pods (1~n) may be triggered with custom resource definition (CRD) operators. Embodiments of the present disclosure disclose building up communication between master pod and worker pods. A new layer of worker pods can be created by CRD operators on demand. Embodiments of the present disclosure disclose no need for a master to know how many pods to be scheduled in advance. The deployment topology may not need to be changed after scaled-out. Embodiments of the present disclosure disclose not only a master-worker deployment model, but also multiple deployment models, e.g., star, net, and mesh models.

Embodiments of the present disclosure disclose dynamically scaling out master-worker pods using a recursive way. Embodiments of the present disclosure disclose detecting a trigger condition, for example, exceeding a threshold, converting a worker pod to a second layer of a master pod, scheduling a second layer of worker pods, and building up relationship between new master pod and worker pods. Embodiments of the present disclosure disclose creating yet another layer of master-worker pods if the second layer of worker pods needs to be scaled-out, and so on. Embodiments of the present disclosure disclose that the master and slave pods can be built up with a hierarchy tree topology to satisfy distributed application requirements. The result may be returned from worker pods to master pod layer by layer, and be consolidated in a master node finally in the container orchestration platform.

The present disclosure will now be described in detail with reference to the Figures. FIG. 1 is a functional block diagram illustrating a container orchestration platform scaling environment, generally designated 100, in accordance with an embodiment of the present disclosure.

In the depicted embodiment, platform scaling environment 100 includes master node 102, worker node 104, and network 120. In an embodiment, container orchestration platform scaling environment 100 may be a platform for scheduling and automating the deployment, management, and scaling of containerized applications. In an example, container orchestration platform scaling environment 100 may be a Kubernetes platform for automating application deployment. In some embodiments, container orchestration platform scaling environment 100 may be a cluster that may include multiple worker nodes 104 that deploy, run, and manage containerized applications and one master node 102 that controls and monitors the worker nodes. A cluster may be a Kubernetes cluster that is a set of node machines for running containerized applications. A cluster may include at least a worker node 104 and a master node 102. A cluster may be a collection of cloud resources required for container running. A cluster may be associated with cloud resources such as cloud server nodes, load balancers, and virtual private clouds. A cluster may include one or more nodes. A node may be a virtual or physical machine that provides computing resources. A node may create workloads. A workload may control one or more pods. A workload may be an abstract model of a group of pods. A pod may represent a running process on a node in the cluster. A pod may include one or more containers. A cluster may have at least one worker node 104. Worker node 104 may host pods that are the components of the application. Worker node 104 may deploy, run, and manage containerized applications. Master node 102 may manage, control, and monitor worker node 104. Master node 102 may run a scheduler service that automates when and where the containers are deployed based on developer-set deployment requirements and available computing capacity. Worker node 104 may include a tool that is being used to manage the containers and a software agent that receives and executes orders from master node 102. A container may be an executable unit of software in which application code is packaged together with libraries and dependencies.

In various embodiments of the present disclosure, master node 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, master node 102 represents a computing system utilizing clustered computers and components to act as a single pool of seamless resources. In other embodiments, master node 102 may represent a server computing system utilizing multiple computers as a server system, such as in a cloud computing environment. In other embodiments, master node 102 may be of a standard compute engine machine type. In general, master node 102 can be any computing device or a combination of devices with access to worker node 104 and network 120 and is capable of processing program instructions, in accordance with an embodiment of the present disclosure. Master node 102 may include internal and external hardware components, as depicted and described in further detail with respect to FIG. 4.

In various embodiments of the present disclosure, worker node 104 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, worker node 104 represents a computing system utilizing clustered computers and components to act as a single pool of seamless resources. In other embodiments, worker node 104 may represent a server computing system utilizing multiple computers as a server system, such as in a cloud computing environment. In other embodiments, worker node 104 may be of a standard compute engine machine type. In general, worker node 104 can be any computing device or a combination of devices with access to master node 102 and network 120 and is capable of processing program instructions and executing operation module 106, master pod 108, and worker pods 110A-N, in accordance with an embodiment of the present disclosure. Worker node 104 may include internal and external hardware components, as depicted and described in further detail with respect to FIG. 4.

Further, in the depicted embodiment, worker node 104 includes master pod 108 and worker pods 110A-N. In the depicted embodiment, master pod 108 and worker pods 110A-N are located on worker node 104. However, in other embodiments, master pod 108 and worker pods 110A-N may be located externally and accessed through a communication network such as network 120. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between worker node 104 and master pod 108 and worker pods 110A-N, in accordance with a desired embodiment of the disclosure.

In one or more embodiments, master pod 108 and worker pods 110A-N may be pods that are groups of containers that share the same compute resources and the same network. Master pod 108 and worker pods 110A-N may be a unit of scalability in container orchestration platform scaling environment 100, for example, in a Kubernetes orchestration platform. Master pod 108 and worker pods 110A-N may be pods that are a model of the pattern of multiple cooperating processes which form a cohesive unit of service. Master pod 108 and worker pods 110A-N may simplify application deployment and management by providing a higher-level abstraction than the set of the constituent applications. Master pod 108 and worker pods 110A-N may serve as unit of deployment, horizontal scaling, and replication. Master pod 108 and worker pods 110A-N may automatically handle co-scheduling, termination, coordinated replication, resource sharing, and dependency management for containers in a pod. Master pod 108 and worker pods 110A-N may enable data sharing and communication among the constituents of the pods. The applications in a pod may use a same network namespace and can thus find each other and communicate using localhost.

A workload may be an object that sets deployment rules for pods. Based on these rules, a deployment can be performed and the workload can be updated with the current state of an application. A workload may control one or more pods. A workload may be a group of pods which may be classified into Deployments, StatefulSets, DaemonSets, jobs, and cron jobs. A Deployment may provide declarative updates for pods and ReplicaSets. A Deployment may change the actual state to the desired state at a controlled rate. A Deployment may create new ReplicaSets, or to remove existing deployments and adopt all existing deployment resources with new deployments. A StatefulSet may be a workload application programming interface (API) object used to manage stateful applications. A StatefulSet may manage the deployment and scaling of a set of pods and provide guarantees about the ordering and uniqueness of the pods. A DaemonSet may ensure that all (or some) nodes run a copy of a pod. As nodes are added to the cluster, pods may be added to the nodes. As nodes are removed from the cluster, pods may be garbage collected. A Job may create one or more pods and may ensure that a specified number of pods successfully terminate. As pods successfully complete, the Job may track the successful completions. When a specified number of successful completions is reached, the task is complete. Deleting a Job may clean up the pods the Job created. A Cron Job may create Jobs on a time-based schedule. A Cron Job runs a job periodically on a given schedule, written in Cron format.

In one or more embodiments, master pod 108 may schedule workloads in work node 104. Master pod 108 may be triggered by a Job. Master pod 108 may trigger worker pods 110A-N. Worker pods 110A-N may be trigged by a Job. In an example, master pod 108 may be created using a command-line client (e.g., kubectl) with a human-readable data-serialization language file (e.g, yaml). Kubectl is a command line tool for controlling Kubernetes clusters. The recursive yaml acronym stands for "yaml ain't markup language," denoting it as flexible and data-oriented. Yaml can be used with an application that needs to store or transmit data. Yaml may be made up of bits and pieces of other languages. Worker pods 110A-N may communicate with runtime services in worker node 104. Worker pods 110A-N can be triggered with the Job based on master pod 108. Master pod 108 may have one or more worker pods 110A-N. Master pod 108 may schedule workloads in worker pods 110A-N. In an example, the communication and connection between master pod 108 and worker pods 110A-N can be in a tree topology. In another example, the communication and connection between master pod 108 and worker pods 110A-N can be in a star, net, mesh or other suitable topologies. In an example, master pod 108 and worker pods can be scaled out using a recursive way in a container orchestration platform, for example, a Kubernetes orchestration platform.

Further, in the depicted embodiment, worker node 104 includes operation module 106. In the depicted embodiment, operation module 106 is located on worker node 104. However, in other embodiments, operation module 106 is may be located externally and accessed through a communication network such as network 120. The communication network can be, for example, a LAN, a WAN such as the Internet, or a combination of the two, and may include wired, wireless, fiber optic or any other connection known in the art. In general, the communication network can be any combination of connections and protocols that will support communications between worker node 104 and operation module 106, in accordance with a desired embodiment of the disclosure. In some embodiments, operation module 106 can be located on master pod 108 and worker pods 110A-N. Operation module 106 can be located on master pod 108. Operation module 106 can be located on each of worker pods 110A-N.

In one or more embodiments, operation module 106 may dynamically scale out master-worker pods using a recursive way for multiple layers of master and worker pods in a container orchestration platform, for example, a Kubernetes orchestration platform. In an example, operation module 106 may be software extensions to Kubernetes that make use of custom resources to manage applications and their components. Operation module 106 may follow Kubernetes principles, notably a control loop. Operation module 106 may be a method of packaging, deploying and managing a Kubernetes application. A Kubernetes application may be an application that is both deployed on Kubernetes and managed using the Kubernetes APIs and kubectl tooling.

In one or more embodiments, operation module 106 is configured to schedule master pod 108 and worker pods 110A-N to deploy applications to a cluster. Operation module 106 may dynamically scale out master pod 108 and worker pods 110A-N using a recursive way for multiple layers of master pod 108 and worker pods 110A-N. In an example, master pod 108 can be initially triggered with a Job. For example, a Job may create one or more pods and may ensure that a specified number of pods successfully terminate. As pods successfully complete, the Job may track the successful completions. When a specified number of successful completions is reached, the task is complete. Worker pods 110A-N can be triggered with the Job based on master pod 108. Master pod 108 may have one or more worker pods 110A-N. Master pod 108 may schedule workloads in worker pods 110A-N.

In one or more embodiments, operation module 106 is configured to build communication between master pod 108 and worker pods 110A-N. The communication can be based on the deployments and the associated types of defined relationships. In an example, a deployment can be in a master-worker mode. In another example, the deployment mode can be in other topology, for example, star, net, and mesh topology. In an example, the communication between master pod 108 and worker pods 110A-N can be in a tree topology. In another example, the communication between master pod 108 and worker pods 110A-N can be in a star, net, mesh or other suitable topologies.

In one or more embodiments, operation module 106 is configured to monitor workloads in each of worker pods 110A-N. Master pod 108 may schedule workloads in worker pods 110A-N. In an example, operation module 106 may monitor workloads in each of worker pods 110A-N such as monitoring the status of a Job in each of worker pods 110A-N. In the depicted embodiment, operation module 106 can be located on worker node 104 and externally master pod 108 and worker pods 110A-N. However, in some embodiments, operation module 106 can be located on master pod 108 and worker pods 110A-N. In some embodiments, operation module 106 can be located on master pod 108. Operation module 106 can be located on each of worker pods 110A-N. Operation module 106 can monitor workloads in each of worker pods 110A-N individually.

In one or more embodiments, operation module 106 is configured to determine whether any of worker pods 100A-N needs to scale out. In an example, operation module 106 may determine whether any of worker pods 100A-N needs to scale out based on a trigger condition such as a pre-defined threshold for each worker pods 100A-N. If operation module 106 determines a workload in any worker pods 100A-N (e.g., worker node 100A) exceeds the pre-defined threshold, operation module 106 may schedule a next layer of worker pods according to the workload and convert a current worker pod (e.g., worker node 100A) to a master pod. Operation module 106 may build up communication and relationships between the new master pod and new worker pods. Operation module 106 may monitor workloads in each of new worker pods. If operation module 106 determines that no workload in any worker pod 100A-N exceeds the pre-defined threshold, operation module 106 may determine no scaling out is needed. Operation module 106 may process the workload. Operation module 106 may return a result to master pod 108. Operation module 106 may consolidate a result to worker node 104. Operation module 106 may dynamically scale out master-worker pods using the recursive way for multiple layers of master and worker pods.

Figure 2:
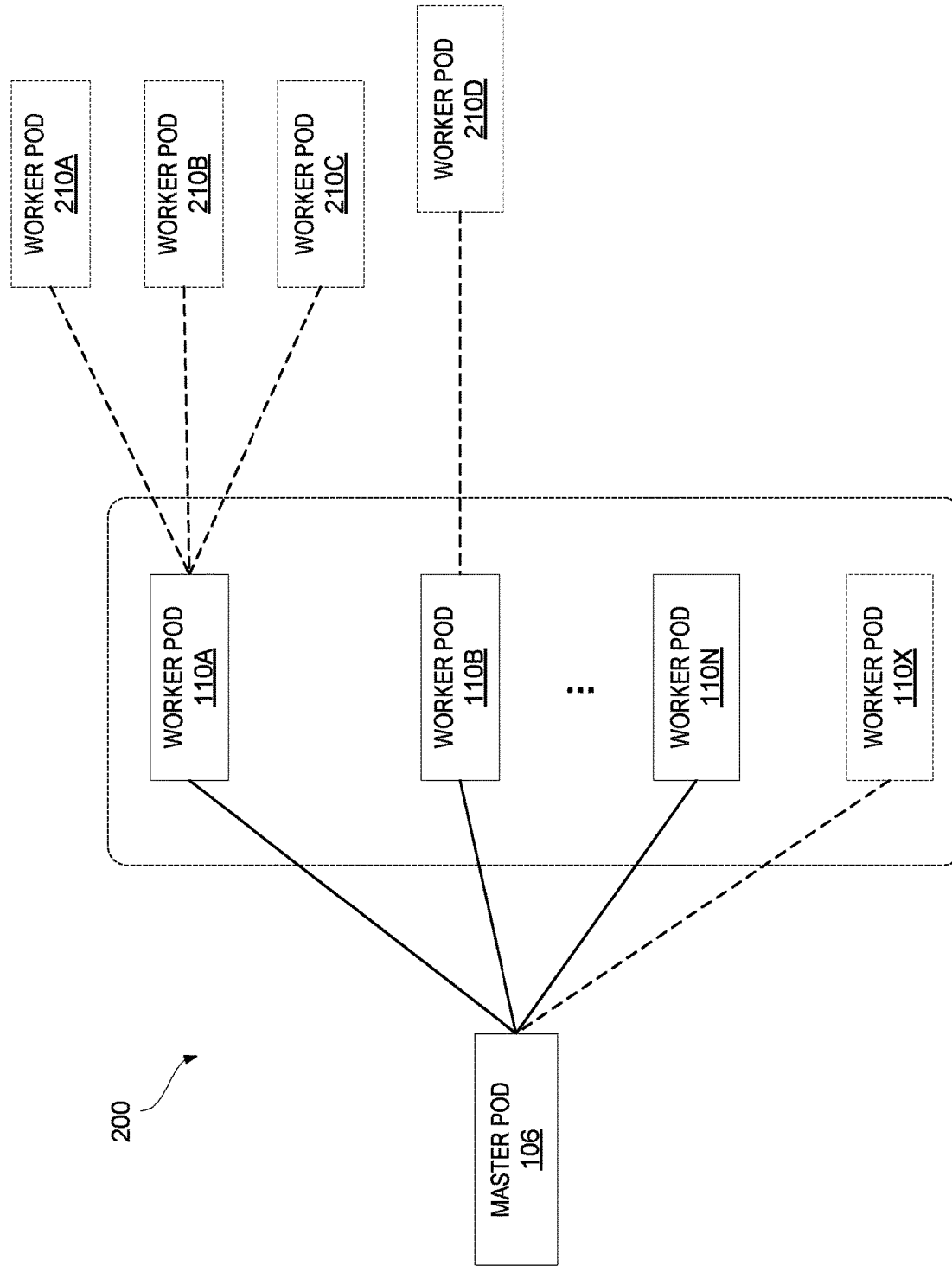
FIG. 2 is an example process depicting example dynamical scaling out using an example recursive way for multiple layers of a master pod and worker pods within a work node of FIG. 1, in accordance with an embodiment of the present disclosure.

FIG. 2 is an example process 200 depicting example dynamical scaling out using an example recursive way for multiple layers of master pod 108 and worker pods 110A-N, in accordance with an embodiment of the present disclosure.

In the example process 200 of FIG. 2, master pod 108 may be triggered by a Job. In an example, master pod 108 may be created using a command-line client (e.g., kubectl) with a yaml file. Worker pods 110A-N may communicate with runtime services in worker node 104. Worker pods 110A-N can be triggered with the Job based on master pod 108. Master pod 108 may have one or more worker pods 110A-N. Master pod 108 may schedule workloads in worker pods 110A-N. In the depicted embodiment, the communication and connection between master pod 108 and worker pods 110A-N can be in a tree topology. In other embodiments, the communication and connection between master pod 108 and worker pods 110A-N can be in a star, net, mesh or other suitable topologies.

Operation module 106 may monitor workloads in master pod 108 and each of worker pods 110A-N. In an example, operation module 106 may monitor workloads in each of worker pods 110A-N such as monitoring the status of a Job in each of worker pods 110A-N. In the depicted embodiment, operation module 106 can be located on worker node 104 and externally master pod 108 and worker pods 110A-N. However, in some embodiments, operation module 106 can be located on master pod 108 and worker pods 110A-N. In some embodiments, operation module 106 can be located on master pod 108. Operation module 106 can be located on each of worker pods 110A-N. Operation module 106 can monitor workloads in each of worker pods 110A-N individually. Master pod 108 may schedule workloads in worker pods 110A-N.

In one or more embodiments, operation module 106 may trigger a new worker pod, e.g., worker pod 110X, based on the workloads. Master pod 108 keeps as the master pod for worker pod 110X. In one or more embodiments, operation module 106 may trigger multiple new worker pods, e.g., worker pods 210A-C, based on the workloads. In the example embodiments, operation module 106 may convert worker pod 110A into a master pod for the new worker pods 210A-C. In other embodiments, operation module 106 may trigger a single new worker pod, e.g., worker pod 210D, based on the workloads. In the example embodiments, operation module 106 may convert worker pod 110B into a master pod for the new worker pod 210D. Operation module 106 may dynamically scale out master-worker pods using the recursive way for multiple layers of master pod 108 and worker pods 110A-N.

Figure 3:
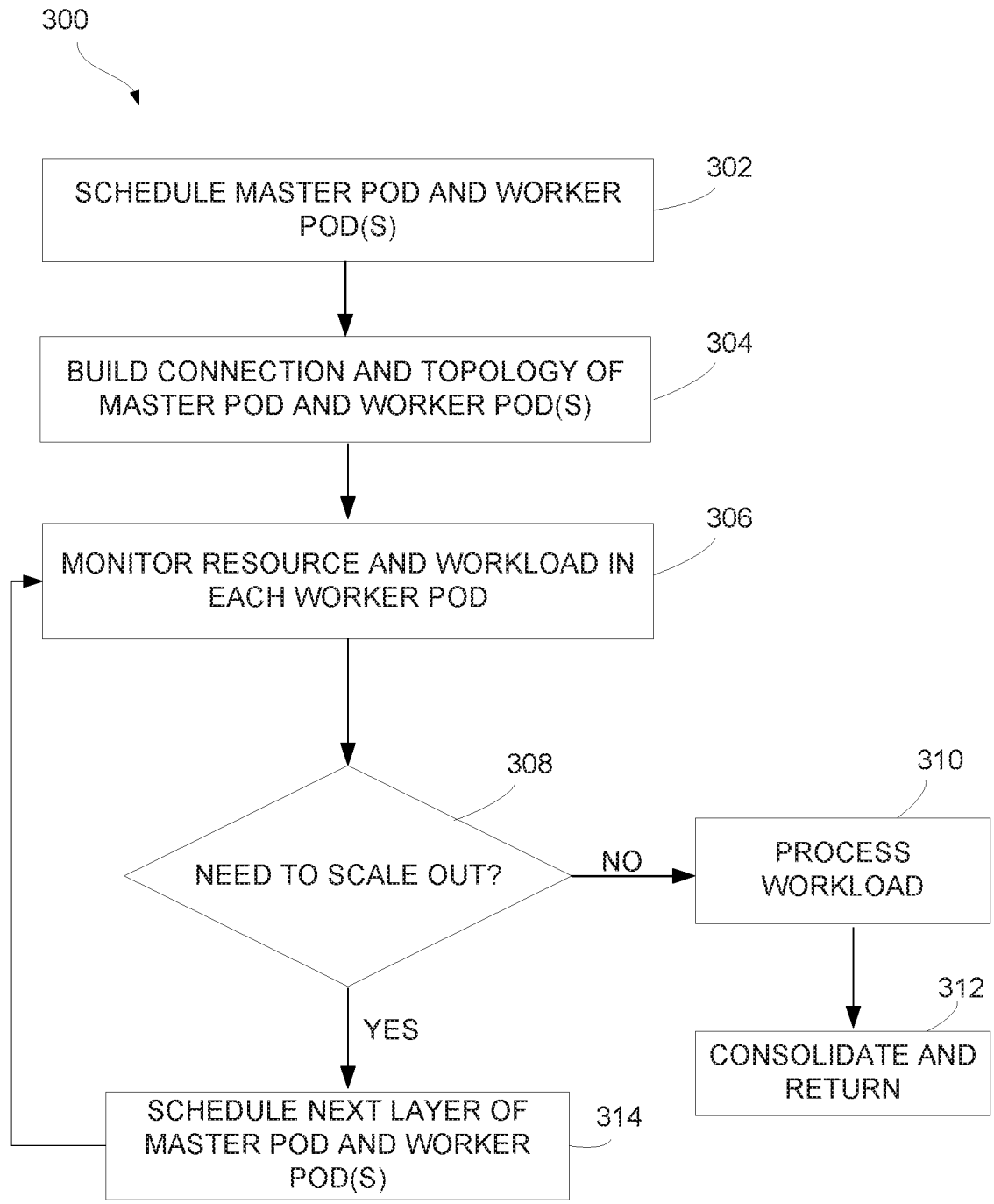
FIG. 3 is a flowchart depicting operational steps of an operation module included in the worker node of FIG. 1, in accordance with an embodiment of the present disclosure.

FIG. 3 is a flowchart 300 depicting operational steps of operation module 106 in accordance with an embodiment of the present disclosure.

Operation module 106 operates to schedule master pod 108 and worker pods 110A-N to make applications be deployed on a cluster. Operation module 106 also operates to build up communication between master pod 108 and worker pods 110A-N. Operation module 106 operate to monitor workloads in each of worker pods 110A-N. Operation module 106 operates to determine whether any of worker pods 100A-N needs to scale out. Operation module 106 also operates to schedule a next layer of worker pods 100A-N according to the workload and convert a current worker pod (e.g., worker node 100A) to a second master pod.

In step 302, operation module 106 schedules master pod 108 and worker pods 110A-N to make applications be deployed on a cluster. Operation module 106 may dynamically scale out master pod 108 and worker pods 110A-N using a recursive way for multiple layers of master pod 108 and worker pods 110A-N. In an example, master pod 108 can be initially triggered with a Job. For example, a Job may create one or more pods and may ensure that a specified number of pods successfully terminate. As pods successfully complete, the Job may track the successful completions. When a specified number of successful completions is reached, the task is complete. Worker pods 110A-N can be triggered with the Job based on master pod 108. Master pod 108 may have one or more worker pods 110A-N. Master pod 108 may schedule workloads in worker pods 110A-N.

In step 304, operation module 106 builds up communication between master pod 108 and worker pods 110A-N. Operation module 106 may build up the communication with a connection and topology between master pod 108 and worker pods 110A-N. The connection and topology can be based on the deployments and the associated types of defined relationships. In an example, a deployment can be in a master-worker mode. In another example, the deployment mode can be in other topologies, for example, star, net, and mesh topology. In an example, the communication between master pod 108 and worker pods 110A-N can be in a tree topology. In another example, the communication between master pod 108 and worker pods 110A-N can be in a star, net, mesh or other suitable topologies.

In step 306, operation module 106 monitors workloads in each of worker pods 110A-N. Master pod 108 may schedule workloads in worker pods 110A-N. In an example, operation module 106 may monitor workloads in each of worker pods 110A-N such as monitoring the status of a Job in each of worker pods 110A-N. In the depicted embodiment, operation module 106 can be located on worker node 104 and can be external to master pod 108 and worker pods 110A-N. However, in some embodiments, operation module 106 can be located on master pod 108 and worker pods 110A-N. In some embodiments, operation module 106 can be located on master pod 108. Operation module 106 can be located on each of worker pods 110A-N. Operation module 106 can monitor workloads in each of worker pods 110A-N individually.

In step 308, operation module 106 determines whether any of worker pods 100A-N needs to scale out. In an example, operation module 106 may determine whether any of worker pods 100A-N needs to scale out based on a trigger condition such as a pre-defined threshold for each worker pods 100A-N. If operation module 106 determines a workload in any worker pods 100A-N (e.g., worker node 100A) exceeds the pre-defined threshold, the process moves to step 314. In step 314, operation module 106 may schedule a next layer of worker pods according to the workload and convert a current worker pod (e.g., worker node 100A) to a master pod. Operation module 106 may build up communication and relationships between the new master pod and new worker pods. The process moves back to step 306. Operation module 106 may monitor workloads in each of new worker pods. If operation module 106 determines that no workload in any worker pod 100A-N exceeds the pre-defined threshold, operation module 106 may determine no scaling out is needed and the process moves to step 310. In step 310, operation module 106 may process the workload. In step 312, operation module 106 may return a result to master pod 108. Operation module 106 may consolidate a result to worker node 104. Operation module 106 may dynamically scale out master-worker pods using the recursive way for multiple layers of master and worker pods.

Figure 4:
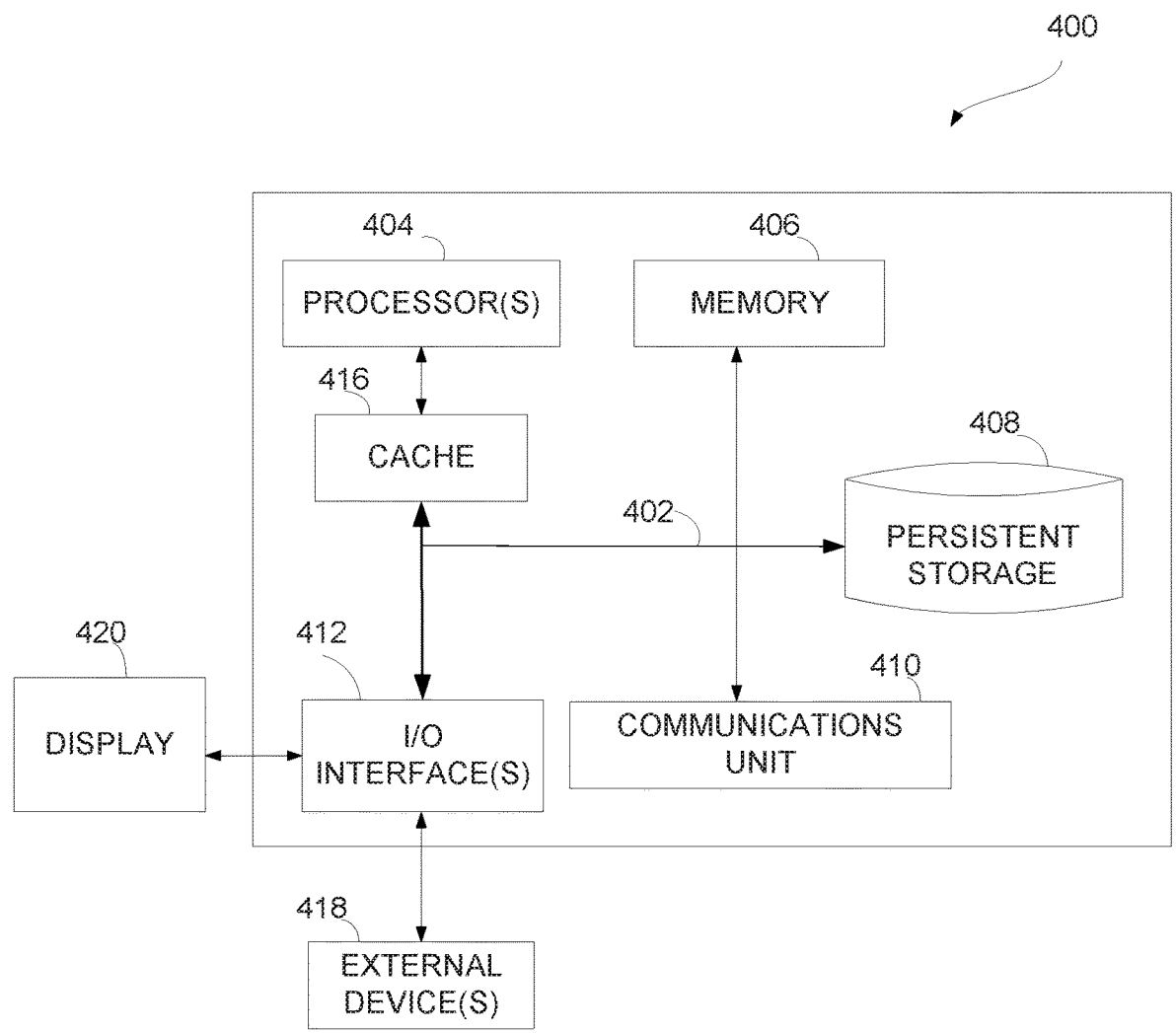
FIG. 4 is a block diagram of components of a master node and the worker node of FIG. 1, in accordance with an embodiment of the present disclosure.

FIG. 4 depicts a block diagram 400 of components of master node 102 and worker node 104 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Master node 102 and worker node 104 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Operation module 106 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Operation module 106 each may be downloaded to persistent storage 408 through communications unit 410.

I/O interface(s) 412 allows for input and output of data with other devices that may be connected to master node 102 and worker node 104. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., operation module 106 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
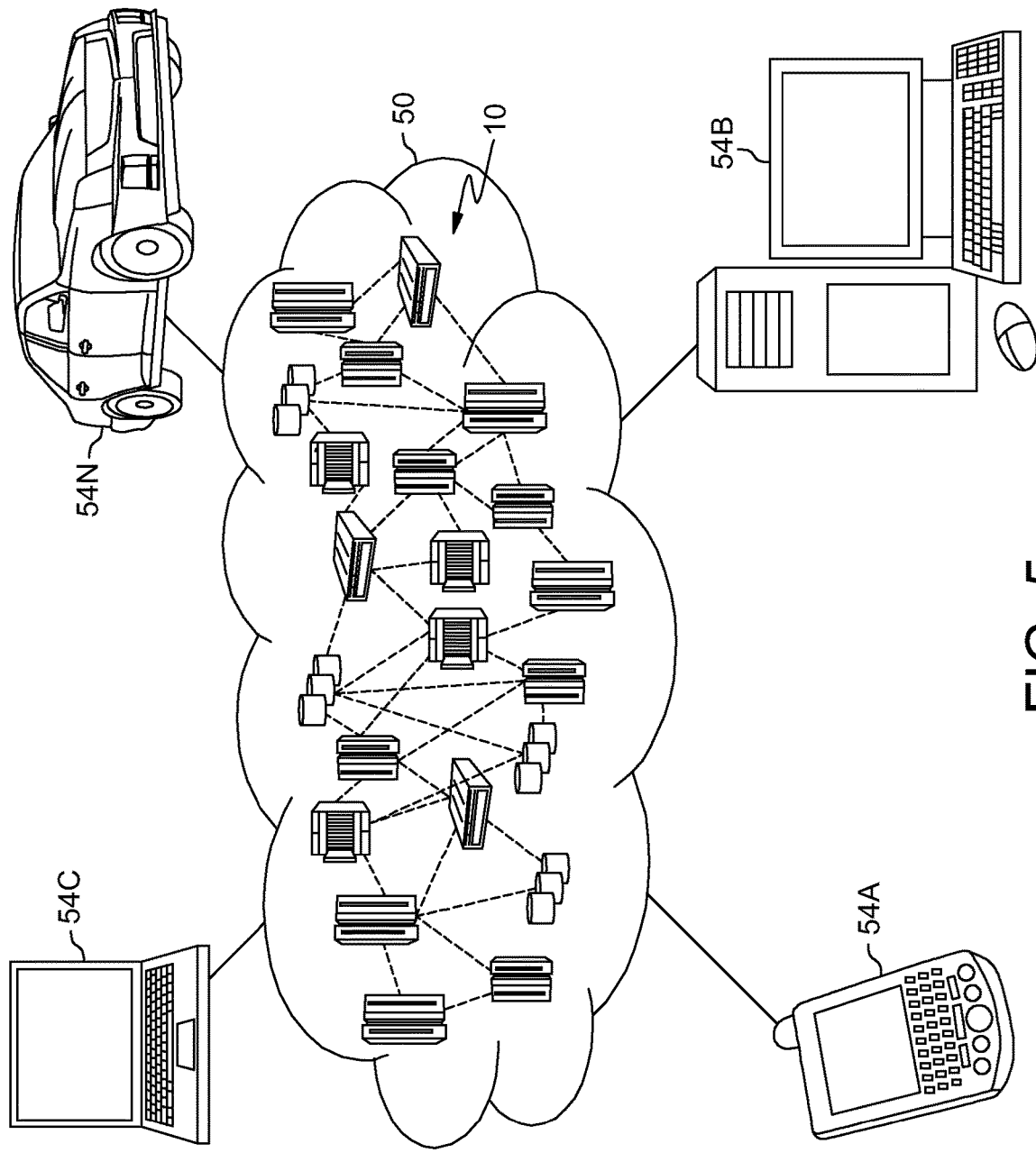
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
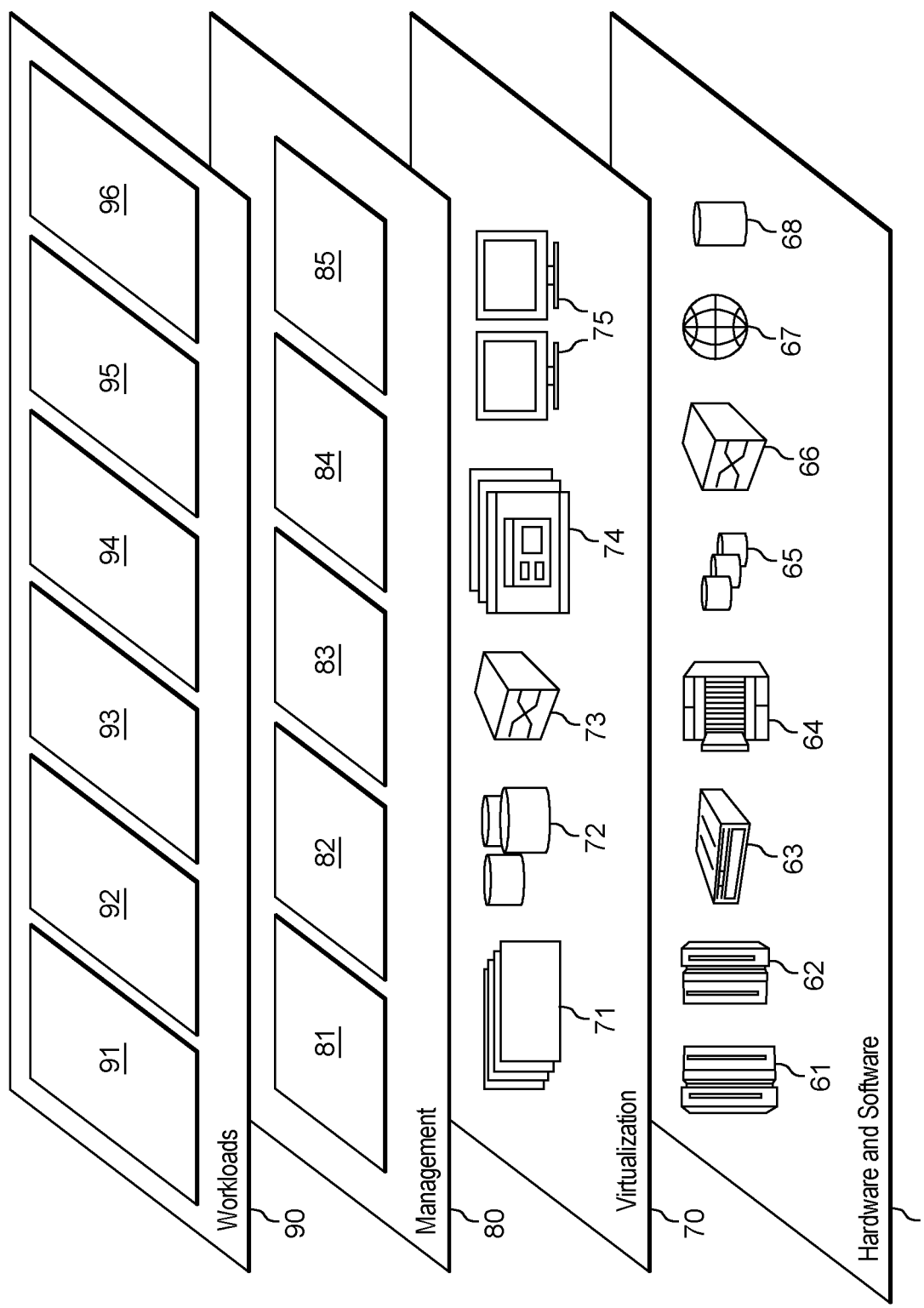
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including operation module 106 as described above with respect to container orchestration platform scaling environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
scheduling, by one or more processors, a first master pod and one or more worker pods for applications be deployed on a cluster;
building, by one or more processors, a topology between the first master pod and the one or more worker pods;
monitoring, by one or more processors, a workload in the one or more worker pods; and
dynamically scaling out, by one or more processors, the first master pod and the one or more worker pods using a recursive way for multiple layers of the first master pod and the one or more worker pods, wherein dynamically scaling out the first master pod and the one or more worker pods using the recursive way comprises:
determining, based on the workload exceeding a pre-defined threshold, that one of the one or more worker pods needs to scale out,
converting any one of the one or more worker pods into a second master pod,
scheduling a next layer of the one or more worker pods according to the workload, and
scheduling one or more new worker pods associated with the second master pod.

2. The computer-implemented method of claim 1, further comprising:
in response to determining that none of the one or more worker pods needs to scale out, processing, by one or more processors, the workload; and
returning, by one or more processors, a processing result to the first master pod.

3. The computer-implemented method of claim 1, wherein the topology is selected from the group consisting of: tree, star, net, and mesh topology.

4. A computer program product comprising:
one or more computer readable storage media, and program instructions collectively stored on the one or more computer readable storage media, the program instructions comprising:
program instructions to schedule a first master pod and one or more worker pods for applications be deployed on a cluster;
program instructions to build a topology between the first master pod and the one or more worker pods;
program instructions to monitor a workload in the one or more worker pods; and
program instructions to dynamically scale out the first master pod and the one or more worker pods using a recursive way for multiple layers of the first master pod and the one or more worker pods, wherein program instructions to dynamically scale out the first master pod and the one or more worker pods using the recursive way comprise:
program instructions to determine, based on the workload exceeding a pre-defined threshold, that one of the one or more worker pods needs to scale out,
program instructions to convert any one of the one or more worker pods into a second master pod,
program instructions to schedule a next layer of the one or more worker pods according to the workload, and
program instructions to schedule one or more new worker pods associated with the second master pod.

5. The computer program product of claim 4, further comprising:
program instructions, stored on the one or more computer-readable storage media, in response to determining that none of the one or more worker pods needs to scale out, to process the workload; and
program instructions, stored on the one or more computer-readable storage media, to return a processing result to the first master pod.

6. The computer program product of claim 4, wherein the topology is selected from the group consisting of: tree, star, net, and mesh topology.

7. A computer system comprising:
one or more computer processors, one or more computer readable storage media, and program instructions stored on the one or more computer readable storage media for execution by at least one of the one or more computer processors, the program instructions comprising:
program instructions to schedule a first master pod and one or more worker pods for applications be deployed on a cluster;
program instructions to build a topology between the first master pod and the one or more worker pods;
program instructions to monitor a workload in the one or more worker pods; and
program instructions to dynamically scale out the first master pod and the one or more worker pods using a recursive way for multiple layers of the first master pod and the one or more worker pods, wherein program instructions to dynamically scale out the first master pod and the one or more worker pods using the recursive way comprise:
program instructions to determine, based on the workload exceeding a pre-defined threshold, that one of the one or more worker pods needs to scale out,
program instructions to convert any one of the one or more worker pods into a second master pod,
program instructions to schedule a next layer of the one or more worker pods according to the workload, and
program instructions to schedule one or more new worker pods associated with the second master pod.

8. The computer system of claim 7, further comprising:
program instructions, stored on the one or more computer-readable storage media, in response to determining that none of the one or more worker pods needs to scale out, to process the workload; and
program instructions, stored on the one or more computer-readable storage media, to return a processing result to the first master pod.

9. The computer system of claim 7, wherein the topology is selected from the group consisting of: tree, star, net, and mesh topology.

* * * * *